Sept. 15, 1970 H. W. HELMKE, JR., ET AL 3,529,027
PROCESS FOR PREPARATION OF ALICYCLIC CONJUGATED DIENES
FROM HYDROCARBON DIMER MIXTURES
Filed Dec. 4, 1967
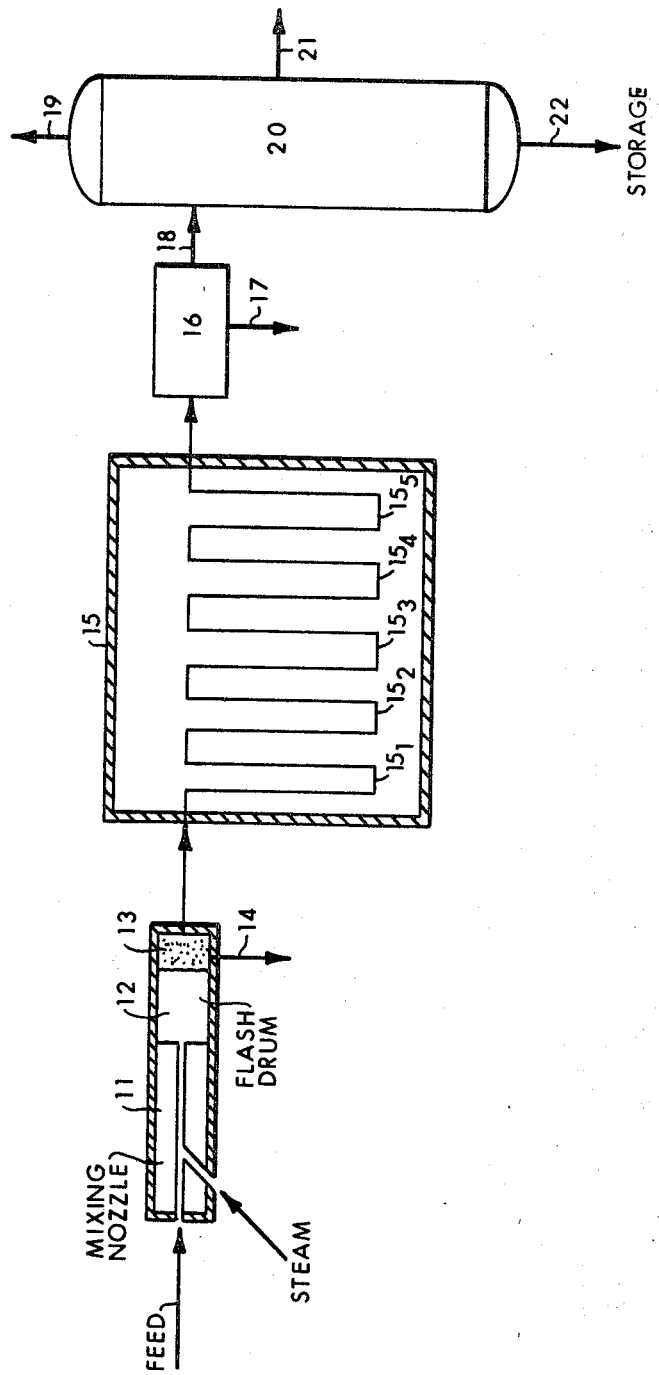
H. W. HELMKE    Inventors
R. H. WAGHORNE
By
Patent Attorney

United States Patent Office 3,529,027
Patented Sept. 15, 1970

3,529,027
PROCESS FOR PREPARATION OF ALICYCLIC CONJUGATED DIENES FROM HYDROCARBON DIMER MIXTURES
Harold W. Helmke, Jr., and Robert H. Waghorne, Baton Rouge, La., assignors to Esso Research and Engineering Company, a corporation of Delaware
Filed Dec. 4, 1967, Ser. No. 687,673
Int. Cl. C07c 3/14, 3/26; C09g 9/14
U.S. Cl. 260—666                                10 Claims

ABSTRACT OF THE DISCLOSURE

This invention relates to a new and improved process for the separation of monomers, particularly for the separation of alicyclic conjugated dienes and aliphatic conjugated dienes from admixture with each other, and from admixture with hydrocarbon mixtures generally. Typically, the boiling point differential between the compounds in such admixtures is incerased by dimerization of the alicyclic conjugated dienes so that separation by distillation is feasible. The dimerized alicyclic conjugated dienes are then dedimerized by vapor cracking to yield the monomer in its desired state of purity. In the basic process, an alicyclic conjugated diene, e.g., cyclopentadiene or a substituted cyclopentadiene, such as methylcyclopentadiene, is thus separated from admixture with lower molecular weight aliphatic conjugated dienes, e.g., isoprene, and other impurities by first treating the admixture in liquid phase at temperatures sufficient to dimerize the alicyclic conjugated diene. The lower molecular weight hydrocarbons are thence separated from the now higher molecular weight hydrocarbons by simple distillation. The present improvement relates to contacting and vaporizing such dimer-containing concentrates with steam, at short contact times, in a low surface area flash zone, while filtering or drawing off polymer and tar impurities prior to vapor phase cracking the dimer to recover the original alicyclic conjugated diene monomer. By removing the tar in advance of vapor cracking, troublesome fouling problems are eliminated.

It is known to separate alicyclic conjugated dienes from admixture with aliphatic conjugated dienes and other hydrocarbons. In a typical operation, such as described by reference to U.S. 2,508,922, steam cracked naphthas which contain alicyclic conjugated dienes are treated to convert the alicyclic conjugated dienes to the dimer for convenient distillation of the lower boiling hydrocarbon from the dimer. A crude mixed dimer concentrate from a steam cracking operation, containing a spectrum of products other than, e.g., cyclopentadiene and methylcyclopentadiene, is thus treated in liquid phase at about 200° F. to dimerize the cyclopentadienes. The $C_7$ and now lower molecular weight hydrocarbons are then separated by simple distillation. The residual dimerized fraction is then cracked in vapor phase to yield the original undimerized cyclopentadienes. Typically, the dimerized fraction is subjected to temperatures ranging from about 300° F. to about 800° F., in the presence of steam, for short contact time ranging from about 0.5 to about 2 seconds to dedimerize the dicyclopentadienes. The cyclopentadienes are stripped and recovered from the mixture in a separate column, by lower temperature distillation.

Vapor phase or steam cracking to dedimerize the alicyclic conjugated dienes has proven superior to liquid phase dedimerization in many respects, notable among which is improved conversions. In liquid phase cracking, the conversion ranges generally to about 80 weight percent, based on the monomer originally present in the dimer concentrate. In steam cracking, especially above about 500° F., however, virtually 100 percent conversion is obtained. In vapor cracking, unfortunately, the greater expected overall efficiency is greately offset by the formation of undesirable polymers and tars which decreases heat transfer, reduces subsequent conversion rates, reduces yield and production capacity, and necessitates frequent downtime to eliminate deposits which interfere with proper operation of the equipment. For these and other reasons liquid phase dedimerization is often preferred, despite the advantages which vapor phase cracking would offer.

The primary object of the present invention is, accordingly, to obviate the foregoing and other difficulties. In particular, it is an object to provide a new and improved process which will lessen such inefficiency and fouling when vapor cracking streams which contain dimerized alicyclic conjugated dienes, especially streams resultant from steam cracking operations. More particularly, it is an object to provide an improved process for the cleanup of such streams to render them more suitable for vapor phase steam cracking.

These objects and other are achived in accordance with the present invention which comprises contacting together superheated steam and a hydrocarbon feed stream which contains a dimerized alicyclic conjugated diene, with impurities, at short contact times sufficient to vaporize the dimer portion of the stream but insufficient to vaporize the impurities which give rise to the formation of polymeric substances and tars. Liquid polymers and tars are removed from the zone, and the vapors are immediately fed into a steam cracking zone.

The hydrocarbon feed is maintained at substantially ambient conditions, and the major part thereof is vaporized or flashed as rapidly as possible by contact with superheated steam. Liquid tars and polymerized substances, whether present ab initio in the feed or generated in situ, are removed from the flash zone, and the vapors are passed into a vapor phase steam cracking zone. The feed is preferably vaporized and the vapors passed from the flash zone while providing a total contact time ranging up to about 5 seconds, and more preferably from about 1 to about 2 seconds.

Suitably, the flash zone is one providing a low surface area:volume ratio (feet$^2$/feet$^3$), e.g., one ranging less than about 50 ft.$^{-1}$, and preferably less than about 25 ft.$^{-1}$. No excess surface area is required, nor desirable, to provide heat for the vaporization. In fact, it is desirable to have minimum surfaces, and even to minimize the liquid volume within the flash zone to reduce the surface area. Liquid films are, in particular, sites of rapid polymerization. All of the heat of vaporization is supplied by the entering feeds, primarily the steam. The feed is flashed to dryness except for the tars and polymeric substances which are withdrawn or removed as completely and as rapidly as feasible as liquids. The resultant temperature within the flash zone ranges from about 200° F. to about 450° F., and preferably from about 275° F. to about 400° F., to affect the desired vaporization. Preferably, the ratio of superheated steam: feed ranges from about 0.5:1 to about 5:1, and more preferably from about 0.8:1 to about 2:1. Low steam:feed ratios result in relatively high dew points and require higher steam temperatures which can increase thermal cracking or polymerization, or both, during flashing. On the other hand, relatively high ratios are favorable process-wise, but steam and steam heating costs are increased.

The invention will be better understood by reference to the following detailed description, which describes a typical operation. In the description reference is made to the attached flow sheet.

Referring to the flow sheet, a feed consisting of a crude mixed steam-cracked naphtha is injected into a mixing nozzle 11 and atomized by contact with superheated steam. The mixture is passed into the flash drum 12 wherein typically from about 97 to about 99 weight percent of the feed is vaporized and passed through the demister 13 (crinkled wire mesh entrainment separator) to enter the cracking furnace 15. Polymers and tars are withdrawn from the flash drum 12 via a drawoff leg 14.

Generally the feed is maintained at from about 50° F. to about 90° F., while the steam is superheated sufficient to provide the desired temperature within the flash drum 12. Typically, a 70° F. feed is flashed with 800° F. steam to provide a 340° F. temperature within the flash drum. A total contact time of 1 second within the flash drum is generally sufficient to permit the desired vaporization, depending on the degree of liquid dispersion. Heavy tars are withdrawn, with some water, from the drawoff leg 14 and some tars are filtered from the vapors by the demister 13.

The furnace 15 contains a plurality of sections, e.g., five furnace sections or coils $15_1$, $15_2$, $15_3$, $15_4$, $15_5$. The first of the sections is a preheat coil $15_1$, within which the vapor is heated from the temperature of the flash drum to the desired reaction temperature. The other four sections are cracking coils maintained at substantially reaction temperature. Generally, a temperature ranging from about 600° F. to about 800° F. is required to dedimerize the feed, at contact times ranging from about 1 to about 3 seconds.

The effluent from the furnace 15 is quenched with water via means not shown to about 300° F., and then passed to a condenser 16 and cooled to about 70° F. to condense and separate water. The water is withdrawn from the condenser 16 via a tap 17. The dedimerized product is then passed via line 18 into a distillation column 20 to separate the monomers. For example, cyclopentadiene is generally withdrawn from the top of the column 20 via line 19, and methylcyclopentadiene is withdrawn via line 21. The bottoms from column 20 are passed via line 22 to slop. The monomers are redimerized and stored.

Pursuant to the present process, virtually stoichiometric quantities of the available dimer in the original feed are converted to monomer. The normal fouling due to the deposition of tars and polymers within the cracking coils is drastically suppressed, and almost eliminated.

In a typical operation, as described above, the furnace cracking coil was operated for 11½ days with no sign of fouling, even in the furnace preheat coil wherein fouling is normally most acute. There was no high pressure drop across any of the coils at the end of the run, this showing that the length of the run could have been easily extended for longer duration.

In contrast, in a previous run made under identical conditions except that the demister was eliminated, the preheat coil was fouled by the end of the 4th day. After decoking, the preheat coil was again coked by the end of the 9th day. After shutting down and cleaning the furnace by baking the coils at 650° F. for 2 hours, the duration of the run was extended for an additional 24 hours. A second and similar cleaning at the end of the 10th day extended the duration of the run for an additional 12 hours.

In further contrast, however, in another previous run when the flash drum was eliminated entirely, both the preheater and cracking coils were severely fouled within only a few hours. It is thus apparent that means must be employed to virtually eliminate all of the tars and polymers prior to heating in a tube furnace.

It is apparent that various changes and modifications can be made without departing the spirit and scope of the invention.

Having described the invention, what is claimed is:

1. A process for the separation of alicyclic conjugated diene dimers from admixture with hydrocarbon feeds containing impurities capable of forming polymeric substances and tars, comprising
    contacting the feed, initially maintained at ambient temperature, with superheated steam in a flash zone, providing temperatures sufficient to substantially vaporize the dimers, but insufficient to vaporize the polymeric substances and tars,
    removing the polymeric substances and tars from the flash zone, and
    passing the vaporized feed into a cracking zone to dedimerize the alicyclic conjugated dienes.

2. The process of claim 1 wherein the temperature of the flash zone ranges from about 200° F. to about 450° F.

3. The process of claim 2 wherein temperature ranges from about 275° F. to about 400° F.

4. The process of claim 1 wherein the feed is initially maintained at temperatures ranging from about 50° F. to about 90° F.

5. The process of claim 1 wherein the steam is superheated to a temperature ranging from about 600° F. to about 900° F.

6. The process of claim 1 wherein the ratio of superheated steam:feed ranges from about 0.5:1 to about 5:1.

7. The process of claim 6 wherein the ratio ranges from about 0.8:1 to about 2:1.

8. The process of claim 1 wherein the contact time between the superheated steam and feed ranges from about 0.5 to about 5 seconds.

9. The process of claim 8 wherein the contact time ranges from about 1 to about 2 seconds.

10. The process of claim 1 wherein the feed is a steam cracked naphtha containing dimers of cyclopentadiene and substituted cyclopentadiene.

References Cited
UNITED STATES PATENTS

| | | | |
|---|---|---|---|
| 2,387,993 | 10/1945 | Hepp | 260—674 |
| 3,340,315 | 9/1967 | Renner. | |

DELBERT E. GANTZ, Primary Examiner

G. E. SCHMITKONS, Assistant Examiner

U.S. Cl. X.R.

260—681.5; 208—48